(12) United States Patent
Rakoff et al.

(10) Patent No.: US 8,789,082 B2
(45) Date of Patent: Jul. 22, 2014

(54) METHOD AND APPARATUS FOR ENABLING INTERACTIVE DYNAMIC MOVIES

(75) Inventors: Simon Rakoff, Reston, VA (US); Jeff Sickles, Washington, DC (US)

(73) Assignee: Starshooter Entertainment, Inc., Reston, VA (US)

( * ) Notice: Subject to any disclaimer, the term of this patent is extended or adjusted under 35 U.S.C. 154(b) by 154 days.

(21) Appl. No.: 13/416,371

(22) Filed: Mar. 9, 2012

(65) Prior Publication Data

US 2013/0239132 A1 Sep. 12, 2013

(51) Int. Cl.
*H04N 7/14* (2006.01)
*H04N 7/173* (2011.01)

(52) U.S. Cl.
USPC .................................. 725/13; 725/32; 725/86

(58) Field of Classification Search
CPC .......... H04N 21/8541; H04N 21/4542; H04N 21/458
USPC .......................... 725/9–11, 13, 16, 86, 25, 32
See application file for complete search history.

(56) References Cited

U.S. PATENT DOCUMENTS

| | | | |
|---|---|---|---|
| 5,737,527 A * | 4/1998 | Shiels et al. | 725/114 |
| 7,379,705 B1 * | 5/2008 | Rados et al. | 455/2.01 |
| 7,784,069 B2 * | 8/2010 | Boss et al. | 725/16 |
| 8,443,385 B1 * | 5/2013 | Schlack | 725/35 |
| 2003/0093790 A1 * | 5/2003 | Logan et al. | 725/38 |
| 2004/0172650 A1 * | 9/2004 | Hawkins et al. | 725/46 |
| 2011/0004892 A1 * | 1/2011 | Dharmaji | 725/9 |

* cited by examiner

*Primary Examiner* — Benjamin R Bruckart
*Assistant Examiner* — Jason Thomas
(74) *Attorney, Agent, or Firm* — Michael P. Fortkort, Esq.; Michael P Fortkort PC

(57) ABSTRACT

A method and apparatus provides immediate audience interaction and participation with a movie while the movie is being shown to the audience, either in a public theater or at home. Theatre patrons are provided the option of responding to prompts on their handheld communication/computing devices to vote on upcoming pre-staged scene selections, thereby enabling majority voting audience participation to control a movie flow.

18 Claims, 15 Drawing Sheets

Multi-viewer Private Venue Instance

Interactive Movie Network Appliance

Dynamic Interactive Movie App
For Set Top Box and Internet Connected TV

Production Process for Dynamic Interactive Movie Content

METHOD AND APPARATUS FOR ENABLING INTERACTIVE DYNAMIC MOVIES

BACKGROUND

The present invention relates generally to methods and apparatuses for viewing movies and more particularly to a method and apparatus for viewing a movie in both large public venues and private venues.

With the advent of high definition and three dimensional television sets concomitant with the development of fiber optic high-speed residential internet service, movie theaters are seeking ways to remain competitive with home theaters. To compete, traditional movie theatres are seeking new ways to attract movie goers by enhancing the overall experience at the movie theatre for their customers.

The present invention is therefore directed to the problem of developing a system and method to enhance a patron's experience at a movie theatre.

SUMMARY OF THE INVENTION

The present invention solves these and other problems by providing a method and apparatus for providing immediate audience interaction and participation with a movie while the movie is being shown to the audience, either in a public theater or at home. Patrons are provided the option of responding to prompts on their handheld communication/computing devices to vote on upcoming pre-staged scene selections, thereby enabling majority voting audience participation to control a flow of the movie.

According to one aspect of the present invention, an exemplary embodiment of an apparatus for enabling a movie viewer to interact with a movie being displayed by a display device includes a processor, storage and a downloadable software application. The storage is to store an interactive movie including one or more interaction points. Each interaction point is associated with multiple alternative movie segments. Each alternative movie segment for a given interaction point has an identical number of frames as all other alternative movie segments for the same interaction point. Moreover, each alternative movie segment has an equal run time as all other alternative movie segments for same interaction point. Each alternative movie segment is assigned a code uniquely identifying the alternative movie segment. The storage is to store the multiple alternative movie segments in association with their unique code. The processor is to couple to the storage and to cause the storage to output one of the alternative movie segments to the display device. The software application is storable on a computer readable media and is downloadable to a mobile computing device. The software application enables a user of the mobile computing device to register with the processor using the mobile computing device and to receive a prompt from the processor on the mobile computing device and to respond to the prompt using the mobile computing device. The processor is to send an interactive message prompt prior to each interaction point to request registered users to vote on which one of the alternative movie segments should be included in the movie being displayed. The processor also receives votes from the registered users regarding the interactive message prompt, tallies all received votes from registered users regarding the interactive prompt and causes the storage to output one of the alternative movie segments based on the tally of the votes to the display device.

According to one possible variant of the above exemplary embodiment, in the exemplary apparatus a wireless network may be used to communicate with one or more mobile computing devices of one or more users.

According to another possible variant of the above exemplary embodiment, in the exemplary apparatus the mobile computing devices may include: a smart phone, an iPhone, an iPad, an iPod touch, a blackberry, a cell phone, a mobile phone, a handheld computer, a laptop computer, or a mobile gaming device.

According to yet another possible variant of the above exemplary embodiment, in the exemplary apparatus the processor may deliver real time input prompts to one or more registered mobile computing devices through the downloadable software application, which has been installed on the one or more mobile computing devices. The processor may receive one or more input responses from the one or more registered mobile computing devices. The processor may also analyze and tabulate the input responses in real-time by a running sum routine, in which each received input response is tallied by a response type, the response type counts are compared and rank ordered, based on a total number of input responses, from most input responses to least input responses. The processor may make an immediate determination as to which one of the two or more alternative movie segments, received the most input responses, and should be output from the storage to the digital display device.

According to still another possible variant of the above exemplary embodiment, in the exemplary apparatus a synchronized content clock may receive run time data from the display device and run time data from the storage and then in combination with the processor may insert one or more movie segments dynamically at exactly a right time to prevent latency or delay in a story flow in the interactive movie being displayed.

According to yet another possible variant of the above exemplary embodiment, in the exemplary apparatus the storage may comprise a relational database, wherein each alternative movie segment is stored in relation to its unique code.

According to still another possible variant of the above exemplary embodiment, in the exemplary apparatus the display device may comprise: a movie projector, a television, a digital display, an LED display, a plasma display, a computerized screen in a public arena, or an AppleTV.

According to yet another possible variant of the above exemplary embodiment, in the exemplary apparatus the display device may include a set top box.

According to another aspect of the present invention, an exemplary embodiment of a method for enabling a movie viewer to interact with a movie being displayed by a display device includes storing in memory an interactive movie including one or more interaction points and associating each interaction point with multiple alternative movie segments. Each alternative movie segment for a given interaction point has an identical number of frames as all other alternative movie segments for the same interaction point, and an equal run time as all other alternative movie segments for the same interaction point. The exemplary embodiment of the method may also assign a code uniquely identifying each alternative movie segment and store each alternative movie segments in memory in relation to the assigned code. The exemplary embodiment of the method may also send an interactive message prompt prior to each interaction point to request registered users to vote on which alternative movie segments should be included in the movie being displayed, receive votes from registered users regarding the interactive message prompt, tally all received votes from the registered users regarding the interactive prompt and output one of the alternative movie segments based on the tally of votes to a display device.

According to one possible variant of the above exemplary embodiment, the exemplary method may include communicating with one or more mobile computing devices of one or more users using a wireless network.

According to another possible variant of the above exemplary embodiment, in the exemplary method the mobile computing device may include: a smart phone, an iPhone, an iPad, an iPod touch, a blackberry, a cell phone, a mobile phone, a handheld computer, a laptop computer, or a mobile gaming device.

According to yet another possible variant of the above exemplary embodiment, the exemplary method may include delivering real time input prompts to registered mobile computing devices through the downloadable software application, which has been installed on the mobile computing devices. The exemplary method may also include receiving one or more input responses from the registered mobile computing devices, and analyzing and tabulating the input responses in real-time by a running sum routine, in which each received input response is tallied by response type, the response type counts are compared and rank ordered, based on a total number of input responses, from most input responses to least input responses. The exemplary method may also include determining which alternative movie segment received the most input responses, and should be output from the storage to the digital display device.

According to still another possible variant of the above exemplary embodiment, the exemplary method may include maintaining synchronization of the interactive movie and the alternative movie segments using a synchronized content clock that receives run time data from the display device and run time data from the storage and in combination with the processor may insert one of the alternative movie segments dynamically at exactly a right time so there is no latency or delay in story flow of the interactive movie being displayed.

According to yet another possible variant of the above exemplary embodiment, in the exemplary method the storage may comprise a relational database, in which each alternative movie segment is stored in relation to its unique code.

According to still another possible variant of the above exemplary embodiment, in the exemplary method the display device may comprise: a movie projector, a television, a digital display, an LED display, a plasma display, a computerized screen in a public arena, or an AppleTV.

According to yet another possible variant of the above exemplary embodiment, in the exemplary method the display device may include a set top box.

According to yet another aspect of the present invention, an exemplary embodiment of a method for creating an interactive movie includes establishing one or more interaction points within the movie, associating each interaction point with multiple alternative movie segments, and preparing each alternative movie segments for a given interaction point so that each alternative movie segments for the same interaction point has an identical number of frames as all other alternative movie segments for the same interaction point.

Moreover, the exemplary embodiment of the method may also include preparing each alternative movie segment for a given interaction point so that each alternative movie segment for the same interaction point has an equal run time as all other alternative movie segments for the same interaction point.

The exemplary embodiment of the method may also assign a code uniquely identifying each alternative movie segment.

According to one possible variant of the above exemplary embodiment, the exemplary method for creating an interactive movie may include segmenting the interactive movie so that movie segments may be pre-staged in a content repository, so that a processor may determine which alternative movie segment is most popular to viewers, and may then trigger a dynamic serving of the most popular alternative movie segment.

According to another possible variant of the above exemplary embodiment, in the exemplary method for creating an interactive movie one of the alternative movie segments may be designated a default movie segment, which is selected if no user inputs are received and processed in time.

According to yet another aspect of the present invention, an exemplary embodiment of an interactive movie may be produced according to the aforementioned exemplary method for creating the interactive movie.

Other advantages and aspects of the various embodiments of the present invention will be apparent upon review of the following drawings and description.

DETAILED DESCRIPTION

In-Theatre Embodiment Overview

One exemplary embodiment of the present invention creates a dynamic interactive movie viewing experience in a commercial movie theatre environment (or large sporting arena or performance venues) by allowing movie patrons to use their wireless mobile device (e.g., smart phone, tablet, touch screen, or music and gaming device) to interact with a movie being publicly displayed on the venue's screen or screens. This embodiment of the present invention works in conjunction with video/audio content that has been produced using a specific technique set forth herein for interactive audio/video content production.

As a result of the present invention, audio and video content being displayed reacts to changes based on audience input responses to system generated prompts. Prompts are delivered to audience members' handheld devices and their responses are collected by the exemplary embodiment of the present invention, which then dynamically delivers, in real time, audio and video content to the venue's projection equipment.

Figure 1A:
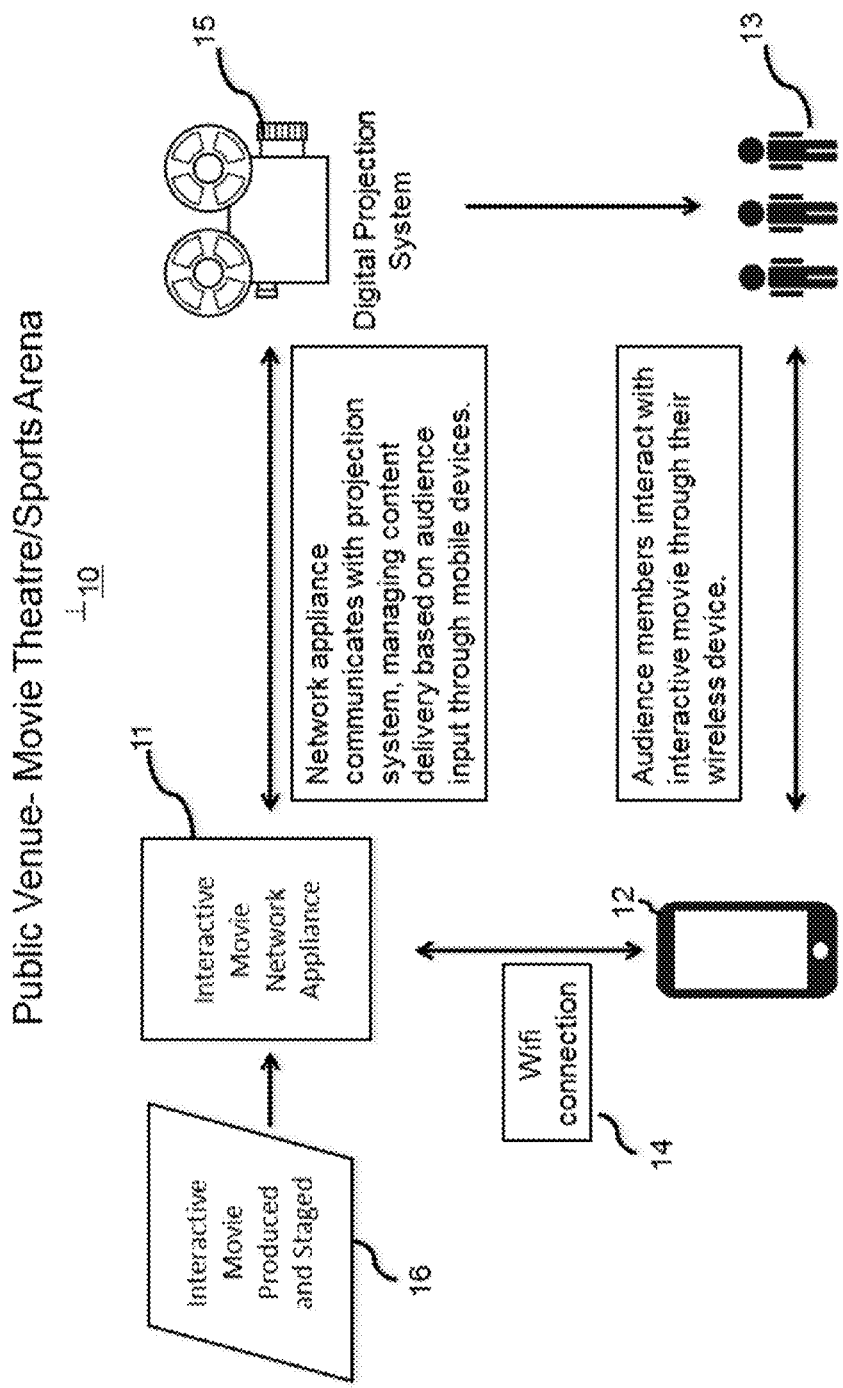
FIG. 1A depicts an exemplary embodiment of a block diagram of a system for enabling audience participation in a movie presentation in a public venue, such as a movie theatre or sports arena, according to one aspect of the present invention.

Turning to FIG. 1A, an exemplary embodiment 10 of the present invention includes a Network Appliance/Content Server 11, which establishes a wireless local area network using standard WIFI and Bluetooth protocols. Once the wireless network is established, the Server 11 interacts with mobile devices 12 of movie viewers 13 in a client-server mode.

Each movie viewer's mobile device 12 can establish a WIFI connection or other wireless link 14 to the wireless network in the usual manner by downloading an interactive movie application 111 (see FIG. 13) in advance in a known manner. This interactive movie application 111 enables the mobile device 12 to connect to the in-theatre network vie WIFI connection 14 and communicate with the content server 11. The mobile device 12 registers with the server 11, which in turn communicates messages with each registered mobile device 12.

Messages are exchanged between the server 11 and registered devices 12 via WIFI and Bluetooth wireless protocols. "Registered" in this case, means a mobile device 12 with the Application 111 installed that has identified itself to the Network Appliance 11 as viewing a specific program or movie.

The Server 11 is sufficiently powerful, fast and employs sufficient memory to establish and sustain connections to as many as 100,000 concurrent users/mobile devices. An exemplary server 11 is configured with: Dual Xeon 2.8 GHz processors, 64 GB 1333 MHz memory, 4 TB Hard Drive Storage (4×1TB drives, 7.2K RPM) with RAID, redundant internal power supply, 802.11 WIFI, Bluetooth, video card with HDMI, DVI and VGA output. The Server 11 stores video content being displayed on the movie screen or screens and outputs audio and video content to digital projection equipment 15 (e.g., an LED/LCD movie projector) in a known manner. File formats supported are consistent with the Digital Cinema System Specification and include MXF compliant for still and moving images, and the Broadcast Wave (.wav) file format for audio files. Additionally, the server supports all standard audio and video file formats commonly used on the Internet. The server is capable of outputting video content with an image pixel array of 4096×1716.

Software and algorithms running on the Network Appliance 11 deliver real time input prompts to registered mobile devices 12 through the installed application 111 on the mobile device 12. The Network Appliance Software receives input responses from each registered mobile device 12, and analyzes and tabulates all input responses in real-time. This is accomplished through a running sum routine, in which each received view response is tallied by response type. The response type counts are compared and rank ordered, based on the total number of responses, from most user responses to least. The Network Appliance Software makes immediate determinations as to which one of several possible pre-staged audio and video content segments 16 (which correspond to the user response options) should be sent from the Content Server 11 to the digital projection equipment 15, based on all received input responses from user's mobile devices 12.

In-Home Embodiment

Figure 1B:
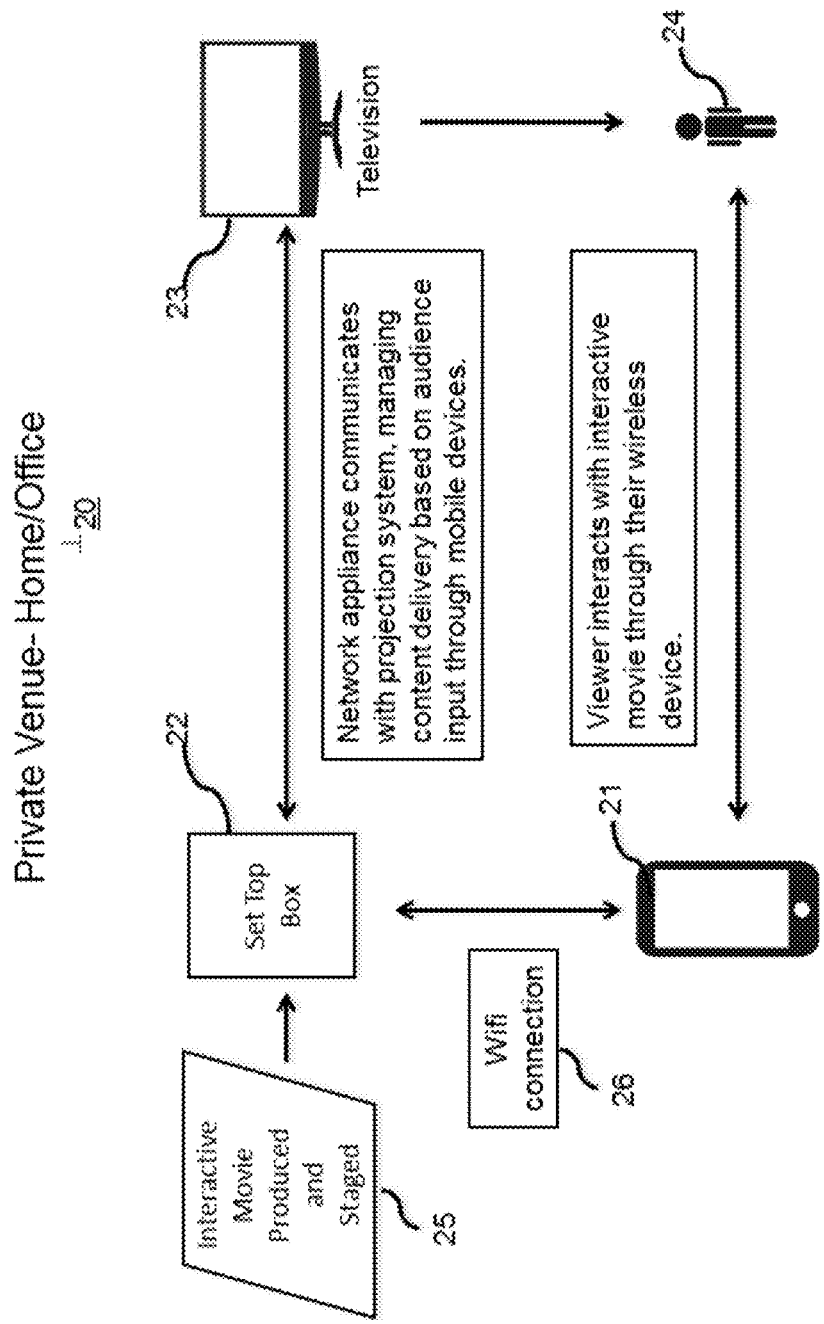
FIG. 1B depicts an exemplary embodiment of a block diagram of a system for enabling audience participation in a movie presentation in a private venue, such as a home or office, according to another aspect of the present invention.

Referring to FIG. 1B, another exemplary embodiment 20 of the present invention creates a dynamic interactive movie viewing experience in the home (or other private venue, such as an office or waiting room) by allowing movie viewers 24 to use their wireless mobile device 21 (e.g., smart phone, tablet, touch screen music and gaming device) to interact with the movie 25 playing on their set top box device 22 or internet connected television 23 (e.g., Apple TV). This embodiment 20 of the present invention works in conjunction with video/audio content 25 that has been produced using a technique set forth herein for interactive audio/video content production (see FIG. 6). Each mobile device 21 is connected to the set top box 22 via a WIFI connection 26 or other wireless link.

Figure 2:
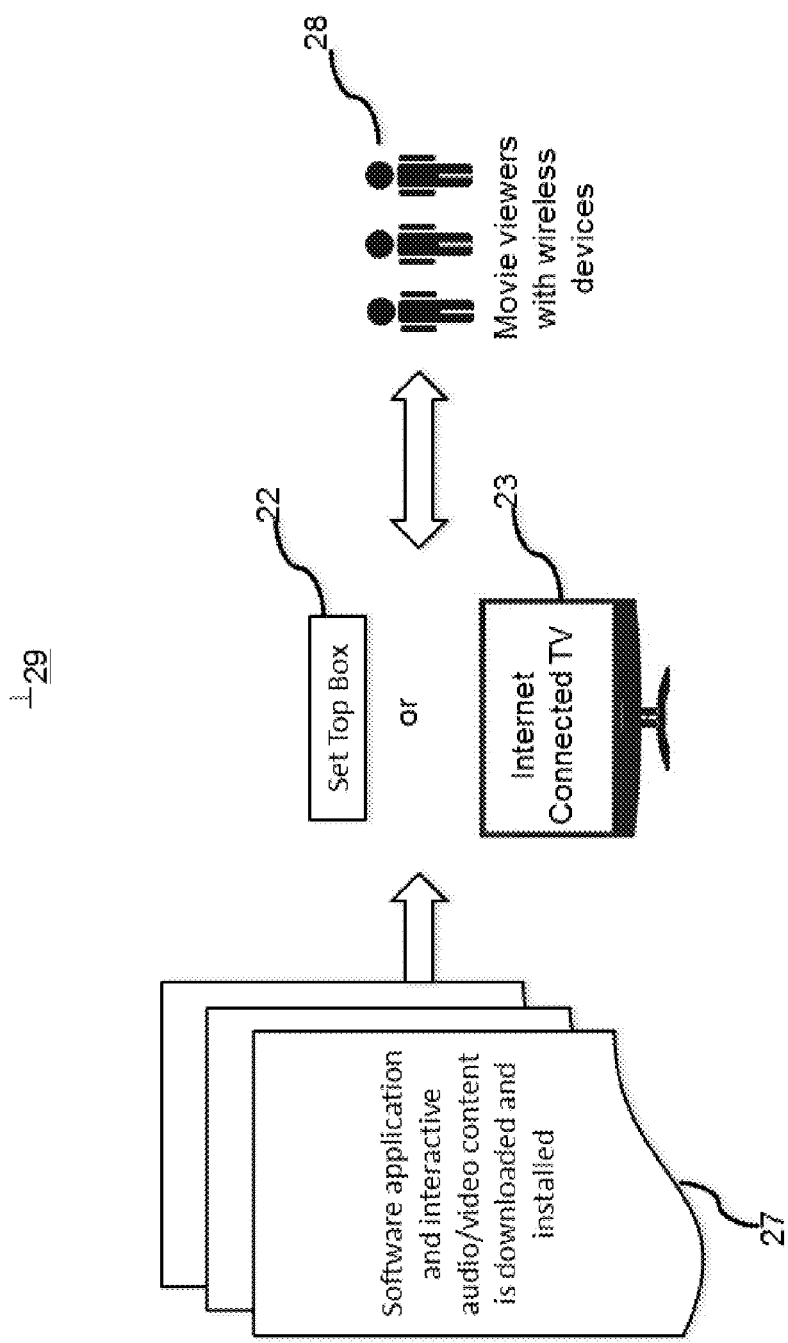
FIG. 2 depicts an exemplary embodiment of a block diagram of a system for enabling multiple viewer audience participation in a movie presentation in a private venue or home theatre according to still another aspect of the present invention.

Turning to FIG. 2, this exemplary embodiment 29 includes a software application 27 that runs on an Internet connected television 23, such as an Apple TV, or set top box 22. The software application 27 utilizes the wireless networking capability of the set top box 22 or internet connected television 23 using standard WIFI and Bluetooth protocols. The software application 27 allows multiple movie viewers 28 with mobile devices 21 (with the mobile device application discussed previously and which has been downloaded to their mobile device) to connect to the set top box 22 or internet connected television 23.

The software application 27 communicates with each registered mobile device 21, stages video and audio content 25 on the set top box 22 or internet connected television 23, and delivers real time input prompts to registered mobile devices 21 through the installed application on the mobile device 21. The software application 27 also receives input responses from all registered mobile devices 21 and analyzes/tabulates input responses in real time. The software application 27 then makes an immediate determination as to which one of several pre-staged audio and video content segments 25 to send to the display 23, based on all received input responses, and then outputs audio and video content to the display 23 based on the aforementioned determination. This is accomplished through a running sum routine where each received view response is tallied by response type. The response type counts are compared and rank ordered, based on the total number of responses, from most user responses to least.

Exemplary Embodiment of Interactive Movie Network Appliance

Figure 3:
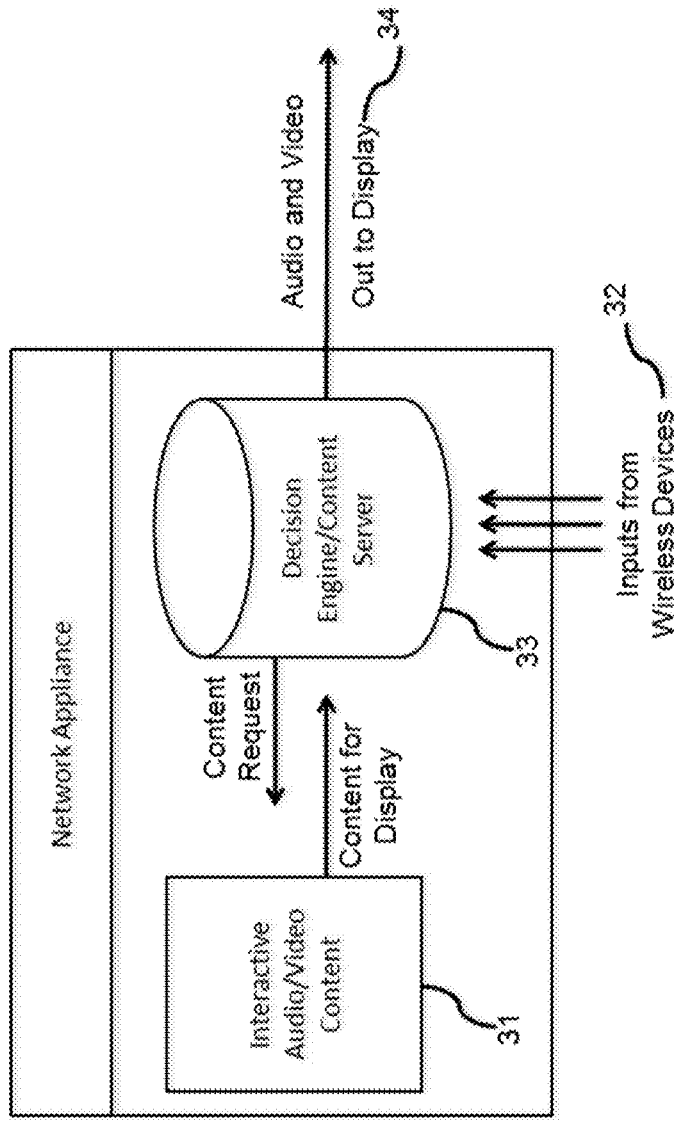
FIG. 3 depicts an exemplary embodiment of a block diagram of an Interactive Movie Network Appliance for use in a system for enabling audience participation in a movie presentation in a public theatre according to yet another aspect of the present invention.

Referring to FIG. 3, shown therein is an exemplary embodiment 30 of an Interactive Movie Network Appliance.

Interactive movies create a two way communication between the movie and the movie audience. This two-way communication centers primarily on the story being told through the movie, but can also include communication for the purposes of building affinity, social networking or facilitation of commerce.

Two-way communication is established between movie content 31 and movie viewers by way of handheld wireless devices 32, such as an Apple iPhone, iPad and iPod Touch devices.

Specially produced content 31 is required to be developed and pre-staged. Within the specially produced and staged movie content 31 are coded Interaction Points 81 (see FIG. 8), where the user is prompted, through their wireless device 32, to provide some feedback. Interaction Points 81 trigger the delivery of user prompts. Users then have a short period of time to provide their responses, through their wireless devices 32.

As an example of an Interaction Point 81, an animated character may walk into their garage and see three vehicles parked there—a unicycle, a racecar, and a horse drawn wagon. On the bottom of the primary viewing screen text appears which reads, "What should Joe use to get to his grandmothers house?" At this moment viewers will see the three vehicle choices on their wireless touch screen devices and will touch one of the three choices. The selection is immediately transmitted to the Interactive Movie Network Appliance 30.

All received user responses are gathered and tabulated and movie content is displayed based on those user responses. Software algorithms are used to determine which response options are the most popular, and to then trigger the dynamic serving of pre-staged content, from a set of content options.

The Interactive Movie Network Appliance 30 is a hardware component which includes storage space for interactive audio and video content in a repository 33 as well as an interface to the internet via which the Interactive Movie Network Appliance 30 provides internet connectivity (thorough either a wired or wireless connection). The Interactive Movie Network Appliance 30 creates an interface between mobile devices 32 and interactive content 31 by establishing and maintaining a wireless connection over which user prompts can be sent to handheld wireless devices 32, and user responses can be sent from wireless devices 32 to the Interactive Movie Network Appliance 30. The Interactive Movie Network Appliance 30 houses a Content Server and Decision Engine 33 and outputs movie content to display devices 34 (movie projection systems, televisions, computer monitors, wireless displays) over a hardwired or wireless connection. Content 31 can be delivered from the Interactive Movie Network Appliance 30 to the display 34 through a variety of connections including: HDMI, DVI, Component Video, VGA, SVGA, S-video and optical audio.

Content Repository

The content repository 33 is storage space on the Interactive Movie Network Appliance 30 where interactive audio and video content is stored and is available for delivery to displays as directed by the Decision Engine. The Content Repository 33 includes a relational database that stages content for immediate and seamless delivery to projection and display devices. The timing of content delivery is based on ongoing multi-directional communication between the Interactive Movie Network Appliance 30 and the projection system.

One element of this communication to ensure seamless delivery of content is a synchronized content clock that uses run time data from the projection system and run time data from the content repository to insert content segments dynamically at exactly the right time so there is no latency or delay in the story flow on screen.

Decision Engine for Interactive Movie Content Delivery

The Decision Engine is a software application running on the Interactive Movie Network Appliance 30. The Decision Engine uses algorithms to process multiple incoming user inputs from mobile devices and dynamically trigger the Content Server 33 to deliver pre-staged audio/video content for display. Routines used include a modified sum-product algorithm for counting and summing received responses. The Decision Engine also has the ability to infer response inputs from registered users whose prompts were not received. This is done using a marginal distribution algorithm to calculate the probability of the value of the responses not yet received, based on 1) the received responses for the particular interaction point and 2) prior received responses during the same movie session. The Decision Engine is able to process user inputs and trigger content serving without introducing latency into the on-screen viewing experience of the movie audience by: (1) providing a default segment that is used if viewer responses are not received in time, and by using segments that are each the same number of frames and are synchronized with the movie via a continuous timing count.

The Decision Engine establishes a movie session by date, time, movie title and unique session identification number. Then the Decision engine associates registered wireless devices with an active movie session by date, time, movie title and unique session identification number. This association is captured and stored in a relational database 33, which resides on the Interactive Movie Network Appliance 30. The Decision Engine sends input prompts to all registered and available devices. Input prompts are in the form of instructions given to the user signaling to them to take an action on their wireless touch screen device. Input prompts use a combination of written text, vibration alerts, sound alerts and on screen iconography to guide the user in providing feedback.

Figure 10:
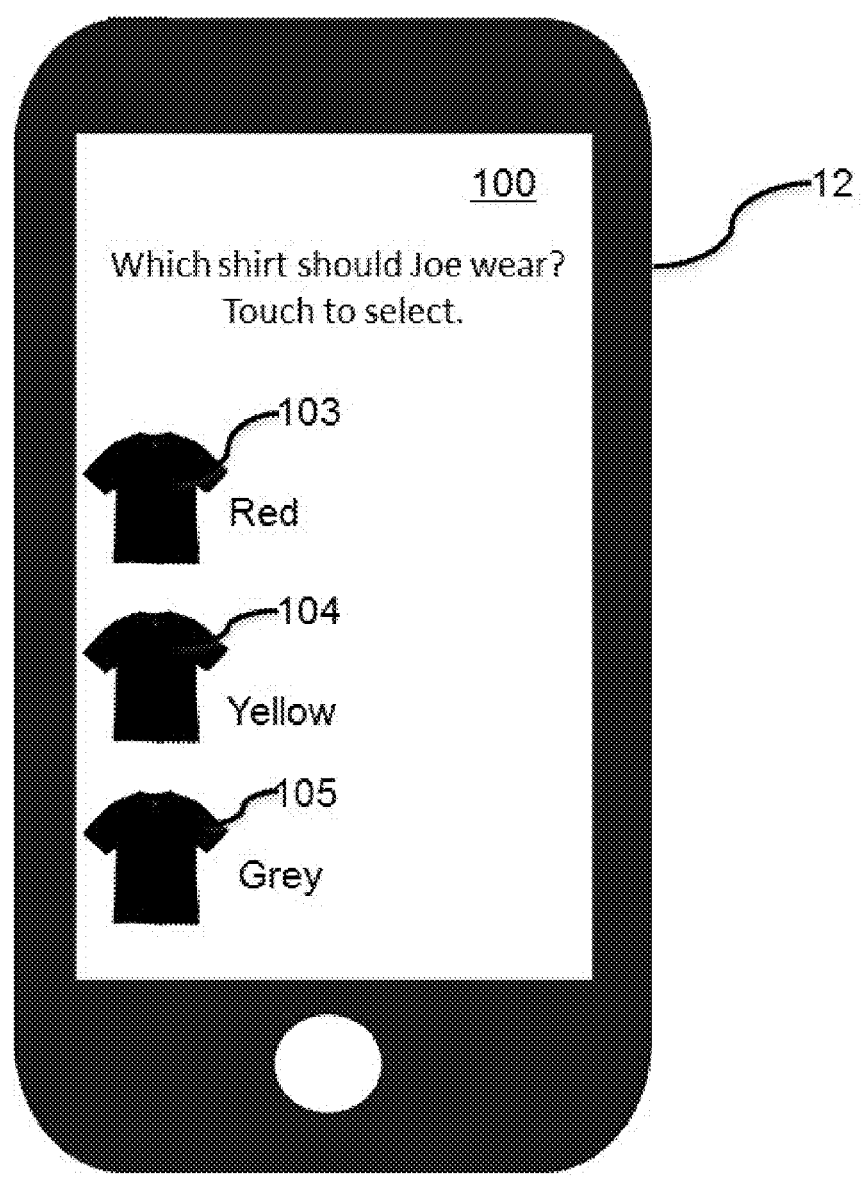
FIG. 10 depicts an exemplary embodiment of a user screen presented to a user on a mobile device according to one aspect of the present invention.

Referring to FIG. 10, as an example, the user may be prompted to indicate the color of shirt a character on screen should choose from their closet. On the primary viewing screen 100 the viewers will see a text prompt 102 saying, "What color shirt should Joe wear? Make a selection on your touch screen now." On their handheld device 12 each user sees three different color shirts 103-105. Whichever one they touch becomes their response input. All registered devices inputs are received and tabulated by the Decision Engine, which then signals the Content Server to send one of several pre-staged content segments to the primary viewing screen. Certainly, more involved interaction is possible, including by way of example, plot conclusions, character development and other movie options limited only by the creativity of the movie creator.

Next, the Decision Engine receives input responses from all registered devices. The Decision Engine receives the inputs that users submit through their wireless devices, in response to input prompts sent by the viewer(s). The user input is initially in the form of an answer to a multiple choice question, a selection from a set of pre-determined choices, a hand or finger gesture using the touch screen, a movement of the wireless device so as to activate the internal accelerometer (which detects motion), use of the camera and/or microphone on the wireless device.

The Decision Engine processes all received input responses from wireless devices. All received user inputs from registered wireless devices are received and stored in a relational database. Initially, while an interactive movie is running, input responses are stored in an active queue so that they are available for immediate processing by the Decision Engine. Once the Interaction Point for which the queued inputs are required has passed, the inputs are loaded into the relational database.

The Decision Engine retrieves indicated audio and video content (from repository) based on input responses. Multiple versions of the same content segment are produced in advance and staged on the Content Server. Each version of a content segment is produced to be the same number of frames, and therefore takes the same amount of time to run. Each segment is tagged with a time-based unique identifier that indicates the beginning time of that segment. The time is based on the location in the movie relative to the first frame of the movie.

Figure 7:
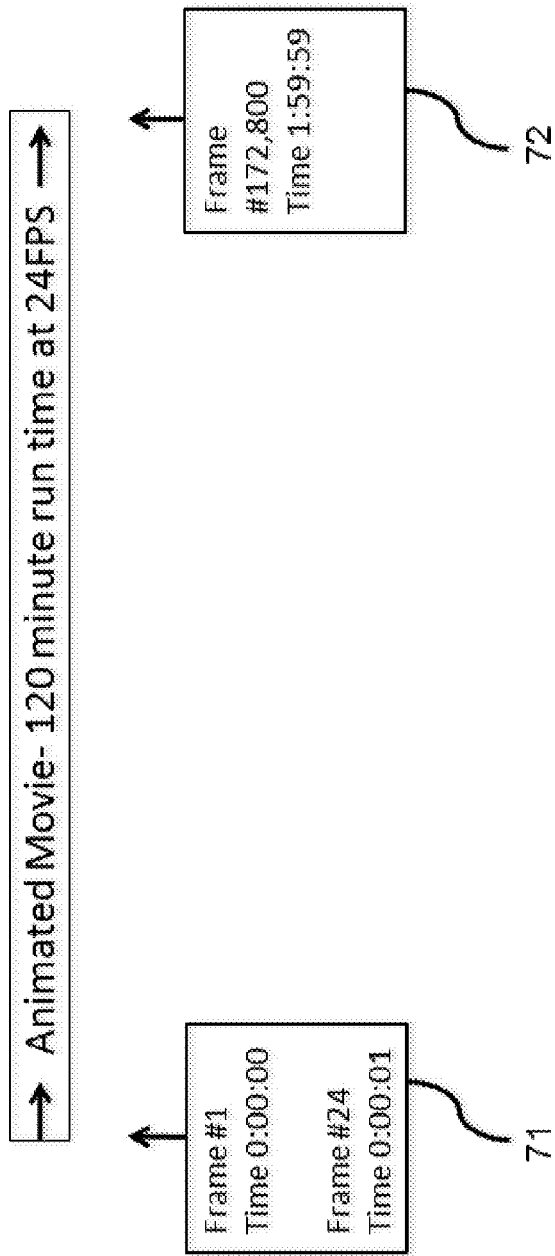
FIGS. 7-9 depict a method for enabling insertion of audience selected scenes in a movie according to still another aspect of the present invention.

Referring to FIG. 7, the first frame 71, i.e., frame 1 occurs at 0:00:00 (zero hours, zero minutes, zero seconds). The last frame 72, e.g., frame 172,800 occurs at time 1:59:59. Time synchronization between the Interactive Movie Network Appliance, the Decision Engine, the Content Server and the projection system is achieved using the Precision Time Protocol (PTP) version 2, and the NST Timer Interval Method for iOS. This exemplary embodiment is assuming a frame speed of 24 frames per second, however, other frame speeds could be used without departing from the scope of the present invention.

Figure 8:
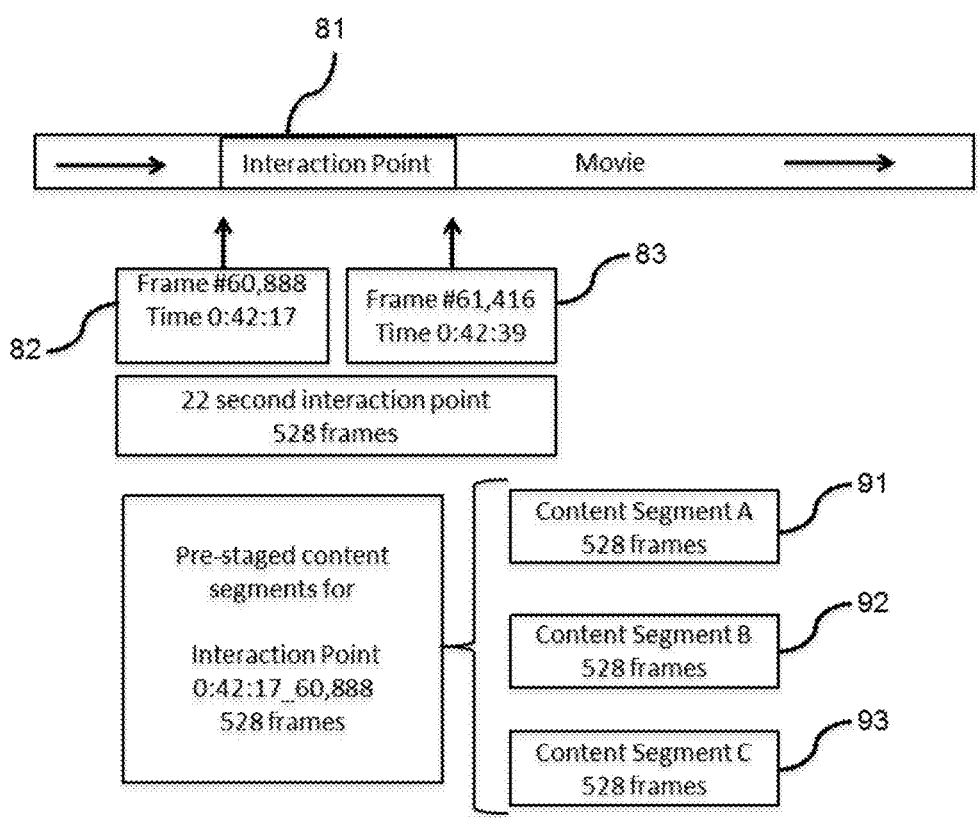
Figure 9:
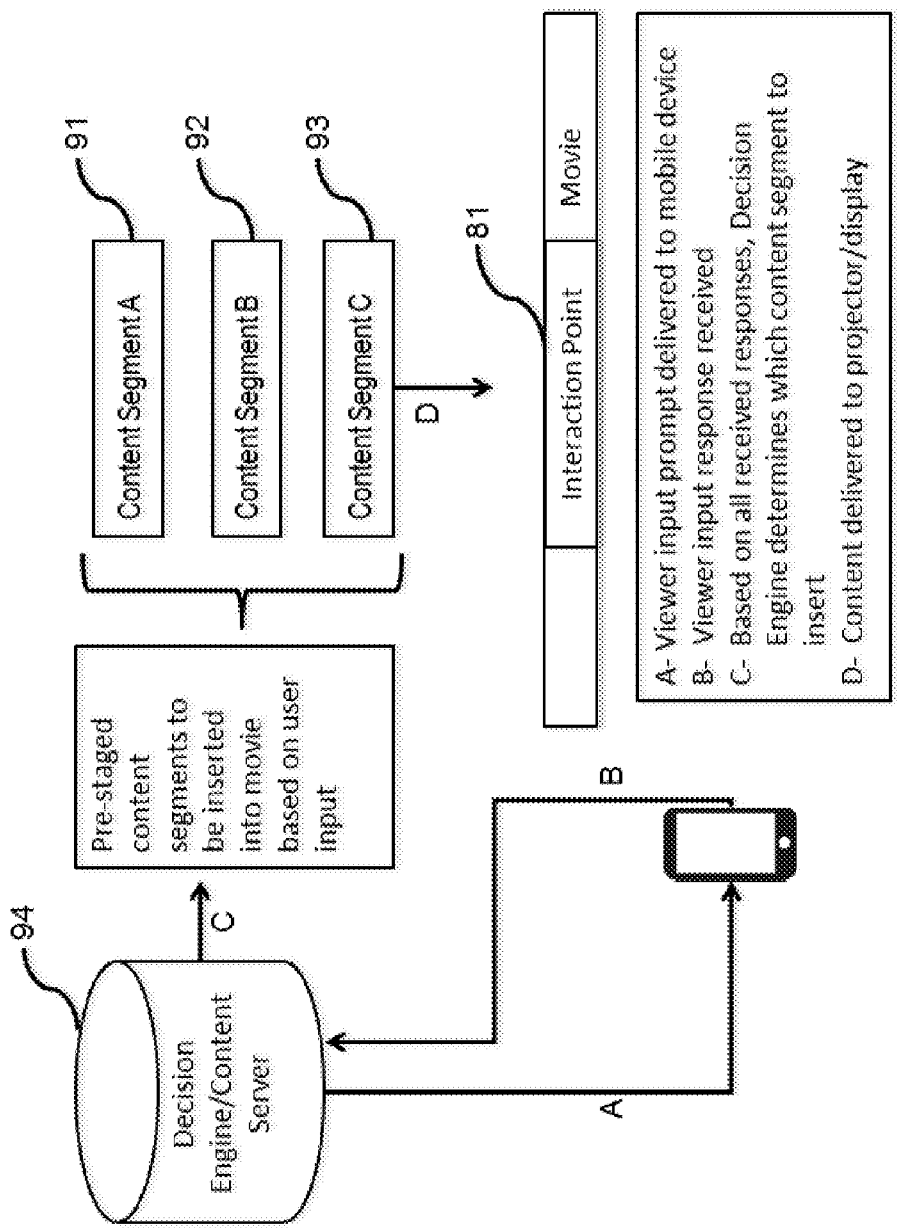

Turning to FIG. 8, each staged content segment 91-93 is also assigned a letter designation, beginning with the letter A and following in alphabetical order. As an example, an Interaction Point 81 that occurs forty-two minutes and 17 seconds into an interactive movie may have three possible content segments 91-93. These content segments 91-93 are produced in advance and staged on the Content Server 94 (see FIG. 9). The content segments 91-93 are tagged with the identifiers: 0:42:17A, 0:42:17B and 0:42:17C, respectively. The A, B and C identifier corresponds to the three choices viewers are able to make at that Interaction Point. The unique identifier, the number of frames and the frame number range for each content segment is stored as metadata in the content repository. The Decision Engine 94 determines what content segment is to be played, based on the user inputs received. The content segment 91 stored with the A designation is the default segment, which will play automatically if no user inputs are received, or if there is a latency problem in the receipt or processing of user responses.

Thus, interaction point 81 begins at frame number 60,888 (element 82) and ends at frame number 61,416 (element 83). The beginning time is 0:42:17 and the end time is 0:42:39, with a frame length of 528 frames. Each content segment 91-93 is produced to have the exact number of frames to ensure synchronization with the movie.

The Decision Engine 94 delivers audio and video content to display screen (at home this is a television, in theatre or other commercial venue it is the digital projection system). Once the Decision Engine 94 has selected the pre-staged content and triggered delivery, that content segment is served by the Content Server 94 directly to the projection system or display. The entire process runs without any interruption in the flow of the movie and what the viewer sees on the screen. Because one pre-staged content segment is always designated as the default, there are no delays caused by the Interactive Movie Network Appliance or any of its components.

The Decision Engine operates in a "fail safe" way, meaning that the movie will continue to play even if no user responses are received, or if the system is unable to process received responses. This fail safe play is accomplished by designating one of the pre-staged content options as the default selection in each instance.

The Decision Engine stores all input response data in a relational database.

Dynamic Interactive Movie Application for Set Top Box and Internet Connected Television A Dynamic Interactive Movie is different than a traditional movie viewing experience, in that there is real-time input solicited from the movie audience and that real-time audience input dynamically changes what is seen on screen. In an interactive movie sounds can also be dynamically selected and changed. In theatres with specialized equipment installed, other elements perceived by the senses, such as smells, temperature and wind can also be dynamically created and changed based on audience input.

Dynamic Interactive movies solicit audience input through the handheld wireless devices the viewers already own and carry. The application works with the Apple iPhone, iPad and iPod Touch devices, as well as other similar devices.

Figure 4:
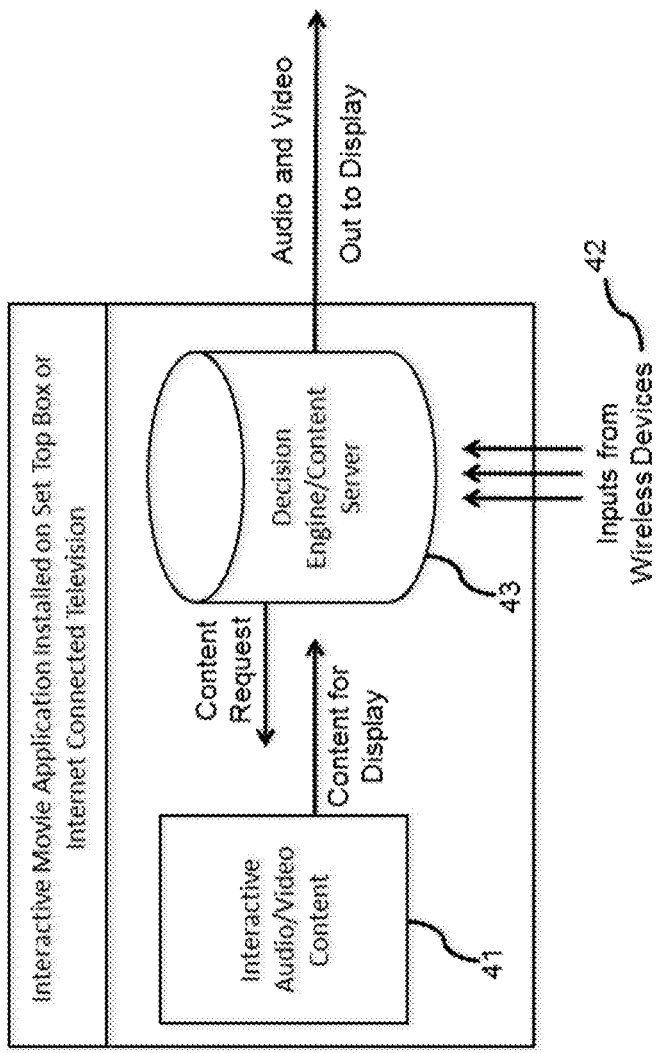
FIG. 4 depicts an exemplary embodiment of a block diagram of an Interactive Movie Network Appliance for use in a system for enabling audience participation in a movie presentation in a private venue or home theatre according to still another aspect of the present invention.

Referring to FIG. 4, shown therein is an exemplary embodiment 40 of a dynamic interactive movie app for a set top box and internet connected television. The Dynamic Interactive Movie Application 40 is a software application, which is downloaded and installed on a set top box device (e.g. Apple TV), or an Internet connected television. The Dynamic Interactive Movie Application 40 uses an existing Internet connection of the set top box or Internet connected television to connect to online sources for audio and video content and stores interactive audio and video content in a repository. The Dynamic Interactive Movie Application 40 provides internet connectivity through either a wired or wireless connection. The Dynamic Interactive Movie Application 40 creates an interface 42 between mobile devices and interactive content. The Dynamic Interactive Movie Application houses a Content Server and Decision Engine 42 and outputs movie content 41 to display devices (e.g., movie projection systems, televisions, computer monitors, wireless displays).

Content Repository

The content repository 43 is storage space on the set top box, Internet connected television or local network where interactive audio and video content is stored and is available for delivery to displays as directed by the Decision Engine.

Decision Engine for Dynamic Interactive Movie Content Delivery

The Decision Engine is a software component of the Dynamic Interactive Movie Application. The Decision Engine establishes a movie session by date, time, movie title and unique session identification number. The Decision Engine then associates registered wireless devices with an active movie session by date, time, movie title and unique session identification number. The Decision Engine sends input prompts to all registered and available devices, receives input responses from all registered devices and processes all received input responses from wireless devices. The Decision Engine retrieves indicated audio and video content from the repository based on input responses and delivers audio and video content to display screen (at home this is a television, in theatre or other commercial venue it is the digital projection system). The Decision engine stores all input response data.

Downloadable Mobile Device Application

Figure 5:
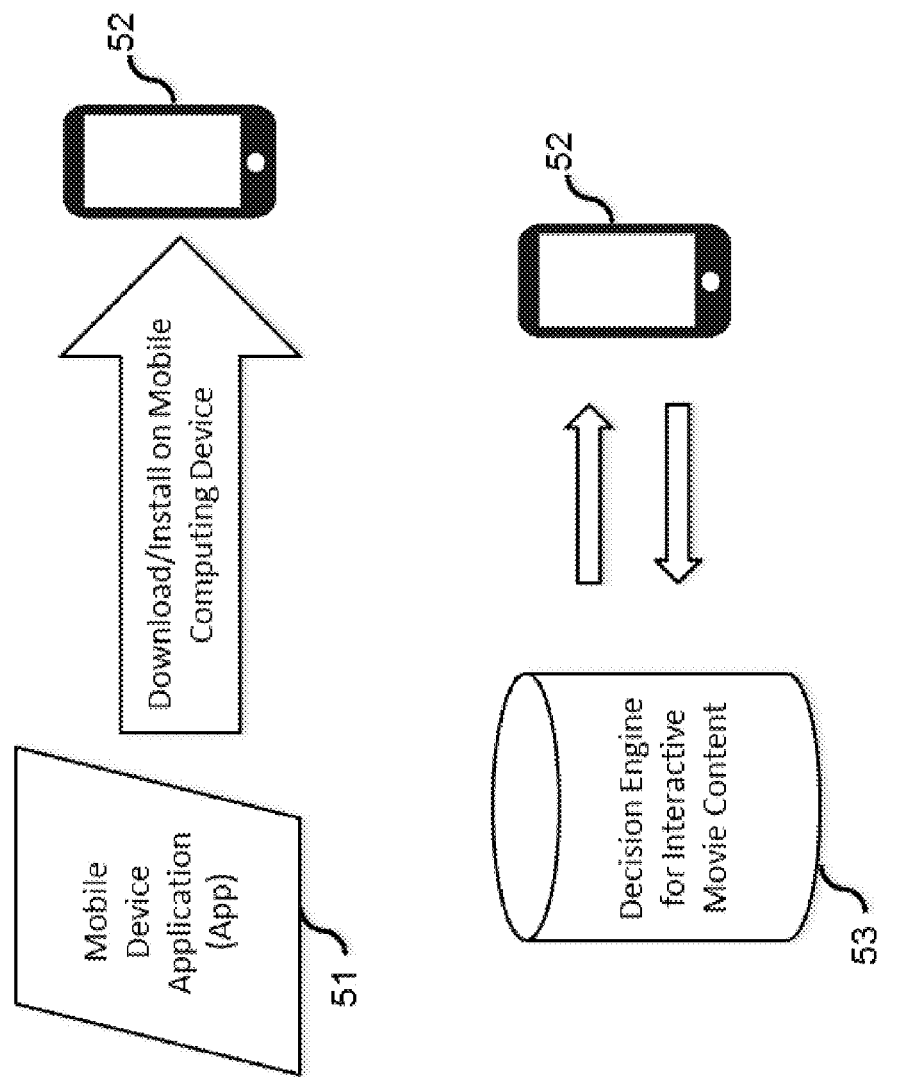
FIG. 5 depicts an exemplary embodiment of a process in a block diagram format for enabling audience participation in a movie presentation in a public or home theatre according to still another aspect of the present invention.

Turning to FIG. 5, one aspect of the present invention includes a software application (App) 51 for a mobile wireless device 52 (e.g. smart phone, tablet, touch screen music or gaming device) that facilitates an Dynamic Interactive Movie experience, where audio and video content is dynamically displayed on the main viewing screen based on input and feedback from movie viewers, collected on the input screen (the mobile wireless device). The invention supports Dynamic Interactive Movie experiences BOTH in home and in commercial movie environments, such as movie theatres, auditoriums, sports stadiums and performance venues.

The app 51 serves as an interface between a movie viewer and the movie being watched through a series of prompts and responses. The mobile device application 51 prompts the viewer to answer a question or make a selection relevant to the movie storyline and then delivers the user responses to a device or application for analysis and consolidation with other real time responses. Based on viewer input pre-staged content is then dynamically selected and served to the viewing screen.

The Dynamic Interactive Movie Mobile Device Application (APP) 51 is software that is downloaded onto a handheld wireless device 52 such as a smart phone, tablet computer, audio or gaming device. The software application is written in the Objective C, C and C++ languages, and are executed on the Apple iPhone, iPad and iPod Touch using the OS Web Kit engine.

The frameworks that are used in the software application include Game Kit, which contains the interfaces for managing peer-to-peer connectivity, and UIKit framework, which contains classes and methods for the iOS application user interface layer. The software application also includes the Foundation framework, which contains interfaces for managing strings, collections, and other low-level data types; MediaPlayer framework, which contains interfaces for playing full-screen video; and CoreMedia framework, which contains low-level routines for manipulating audio and video.

Additionally, the software application includes CoreBluetooth framework, which is a back up to the GameKit and which allows the app to use BlueTooth. The software application also includes CFNetwork framework, which contains interfaces for accessing the network via Wi-Fi and cellular radios; System Configuration framework, which contains interfaces for determining the network configuration of a device; MessageUI framework, which contains interfaces for composing and queuing email messages; and CoreData framework, which contains interfaces for managing the application's data model.

The software application also has the ability to operate in one of two modes—paired mode or independent play mode.

Paired Mode

The application has the ability to pair the Apple iPad displaying the Dynamic Interactive Movie with an Apple iPhone or 2nd generation iPod Touch (second screen). In paired mode the app can display content at full screen resolution, connect wirelessly to a second screen paired device, receive input prompts from primary screen (iPad), display input prompts on second screen, and receive user inputs from second screen.

The pairing process is active and secure so that an unauthorized second screen within range cannot connect to the application without the user's knowledge or consent.

Independent Play Mode

When not paired with a second screen the application can operate in independent play mode. In this mode all app controls, user prompts and user inputs happen on the primary screen (iPad).

This dual-mode capability is made possible by the application architecture which utilizes one universal application bundle with two distinct components—the base application component for the primary screen device (iPad) and the second screen application component for the handheld wireless device (Apple iPhone/iPod Touch).

Nominally, there is one single application which is downloaded and installed on BOTH the iPad and the iPhone/iPod Touch. This is the universal application bundle. The bundle is able to determine which hardware device it is running on and activate the appropriate component automatically.

The mobile App allows the user to create and store a user profile including name, photo, address, phone, email and a variety of personal preference information relating to movie going/viewing and can store credit card payment information related with the user profile. The mobile app has the ability to integrate the user profile with web-based social media systems, such as for example, Facebook, Twitter, or Linked-in.

Moreover, the mobile app determines the location of the mobile device, relative to the movie screen using WIFI location based services (LBS), and allows the user to identify the section, row and seat number they are in at a commercial venue through WIFI location based services (LBS), or through direct user input in venues where row and seat numbers are marked.

Additionally, the mobile app tracks a movie session by date, time, movie title and unique session identification number and communicates wirelessly with a Decision Engine 53 for Dynamic Interactive Movie Content Delivery. The mobile app receives input prompts from the Decision Engine 53 for Dynamic Interactive Movie Content Delivery, and delivers input responses to the Decision Engine 53 for Dynamic Interactive Movie Content Delivery.

The mobile app also can integrate with the venue's concession and ticket point of sale systems to facilitate purchases by displaying concession options available at the commercial venue the user is in, enabling the user to place a concession order for pick up or delivery to the user's seat (in venues where that service is available); and enables the user to make a payment for ordered concessions using stored payment information. Additionally, the mobile app may allow the user to purchase (gift) concessions for another user in the same active movie session and notify them of the purchase by on-screen message.

Still further, the mobile app may at the conclusion of a movie, prompt the user to provide a rating and review of the movie.

The mobile app includes the capability to enable a user to request a chat session with another device in the same active movie session and to permit a user to choose to accept or decline a chat session request.

Figure 11:
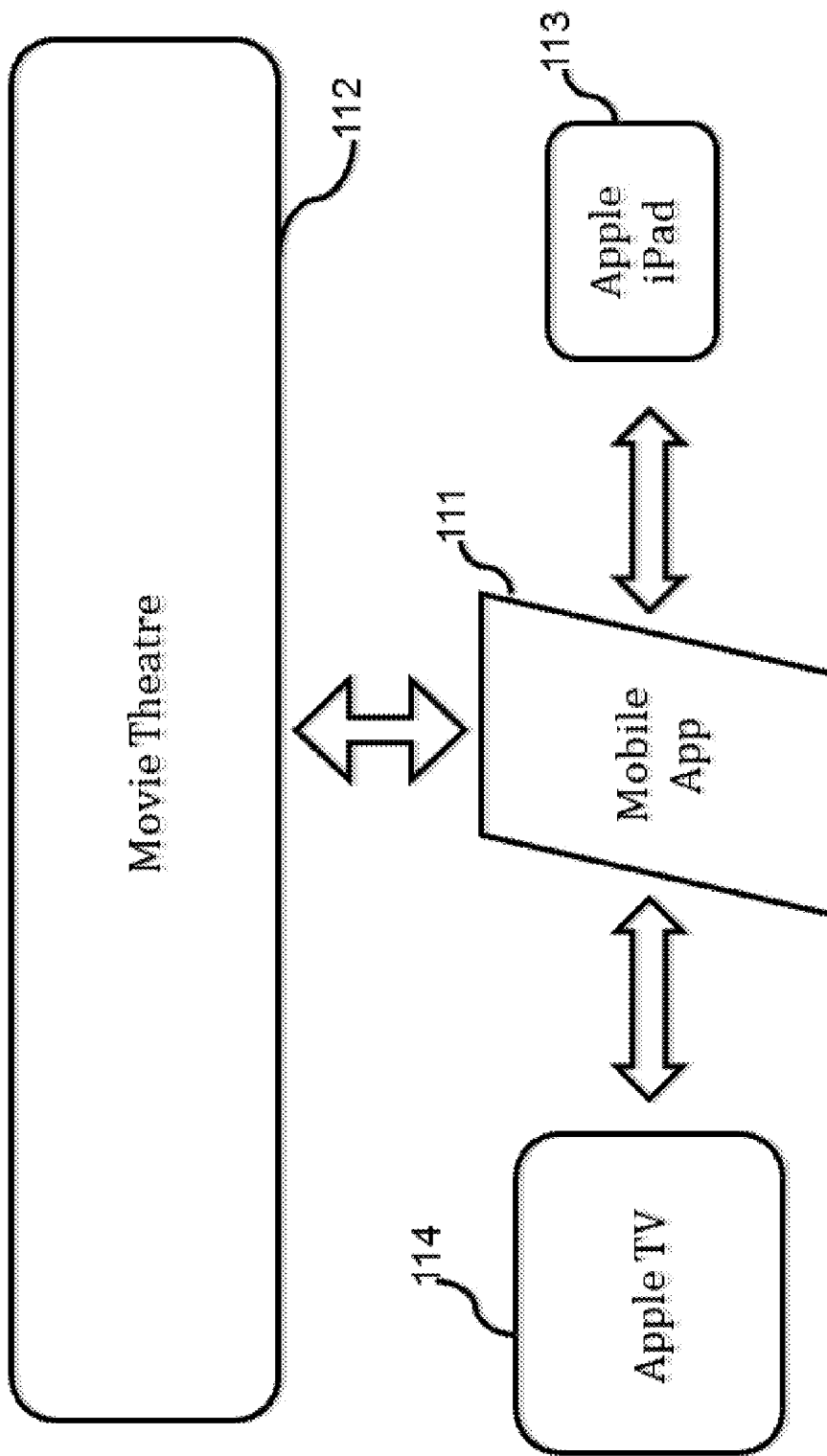
FIG. 11 depicts an exemplary embodiment of a block diagram of a system for enabling audience participation in a movie presentation in a public or home theatre according to one aspect of the present invention.

The Interactive Movie mobile App is a software application that allows a user to interact with an movie 112 (either animated or non-animated) playing either in a public movie theatre, on an Apple iPad 113 or on an Apple TV device 114 (See FIG. 11).

Figure 12:
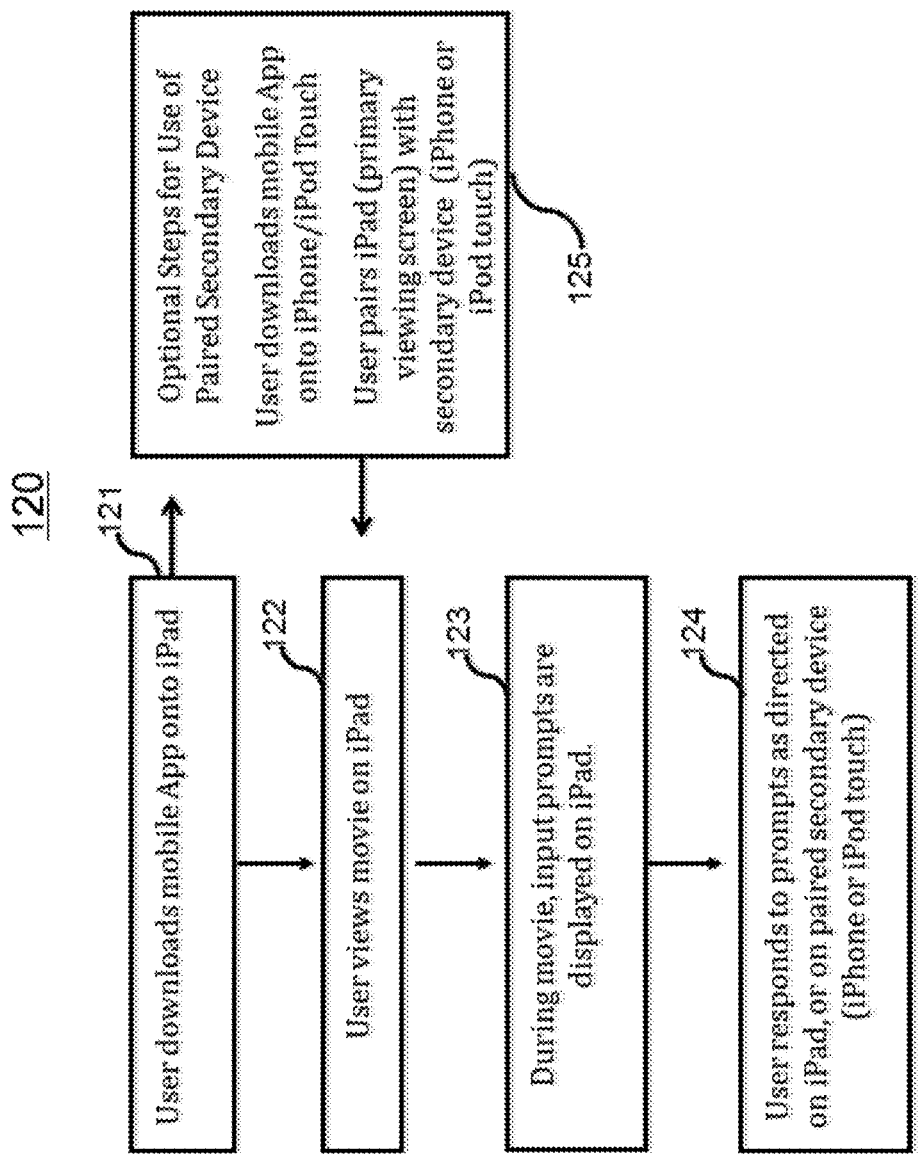
FIG. 12 depicts an exemplary embodiment of a method for viewing an interactive movie using an iPad according to yet another aspect of the present invention.

Turning to FIG. 12, shown therein is an exemplary embodiment of a method 120 for interacting with a movie using an iPAD or similar mobile device. First, the mobile App is downloaded by the user and installed on an Apple iPhone, iPod Touch and/or iPad in step 121. The primary function of the mobile App is to facilitate multi-directional communication between the movie (specially produced interactive animated content) and movie viewers.

Next, the user views the movie on an iPad in step 122. During the movie, input prompts are displayed on the iPAD in step 123. In step 124, the user responds to the prompts as directed on the user interface screen or on a paired secondary device, such as an iPhone or iPod touch. The optional steps 125 of use of a paired secondary device include downloading the mobile App onto an iPhone or iPod touch. The user then pairs the iPad (which is the primary viewing screen) with his or her secondary device, such as an iPhone or iPod touch.

Figure 13:
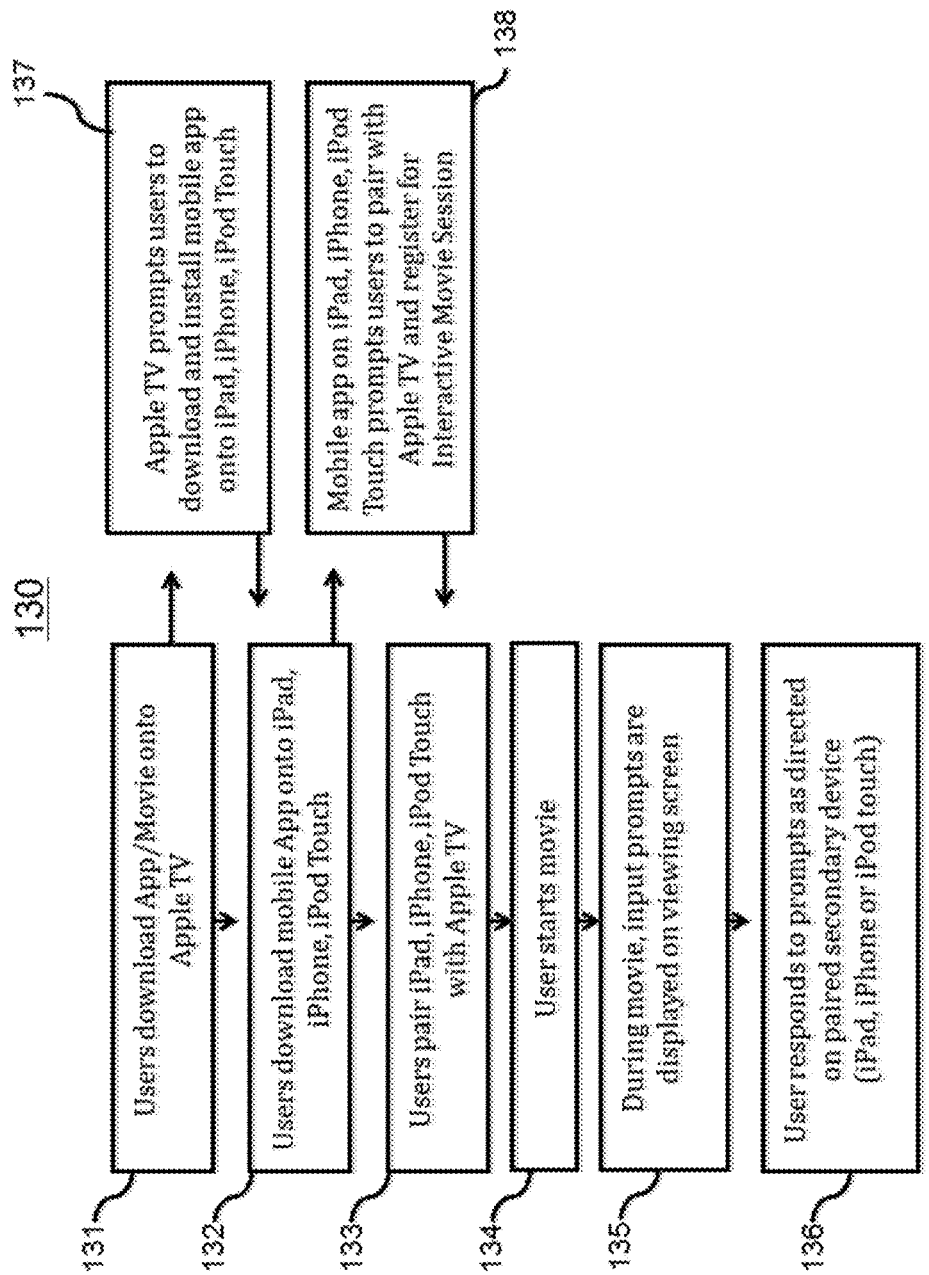
FIG. 13 depicts an exemplary embodiment of a method for viewing an interactive movie using an Apple TV according to yet another aspect of the present invention.

Turning to FIG. 13, shown therein is an exemplary embodiment of a method 130 for interacting with a movie being displayed on an Apple TV. First, the mobile App is downloaded by the user and installed on the Apple TV in step 131.

The Apple TV app prompts the users to download and install the mobile All onto their iPad, iPhone or iPod touch in step 137.

Next in step 132, the users download the mobile App onto their iPad, Iphone or iPod touch. In step 138, the mobile App on the user's iPad, iPhone or iPod touch prompts the users to pair with the Apple TV and register for an Interactive Movie Session, and in step 133 the user's pair their mobile device with the Apple TV.

Next, the user starts the movie in step 134. During the movie, input prompts are displayed on a screen (of their mobile device or Apple TV or both) in step 135. In step 136, the user responds to the prompts on the paired/registered iPad, iPhone, or iPod touch as directed on the user interface screen.

Figure 14:
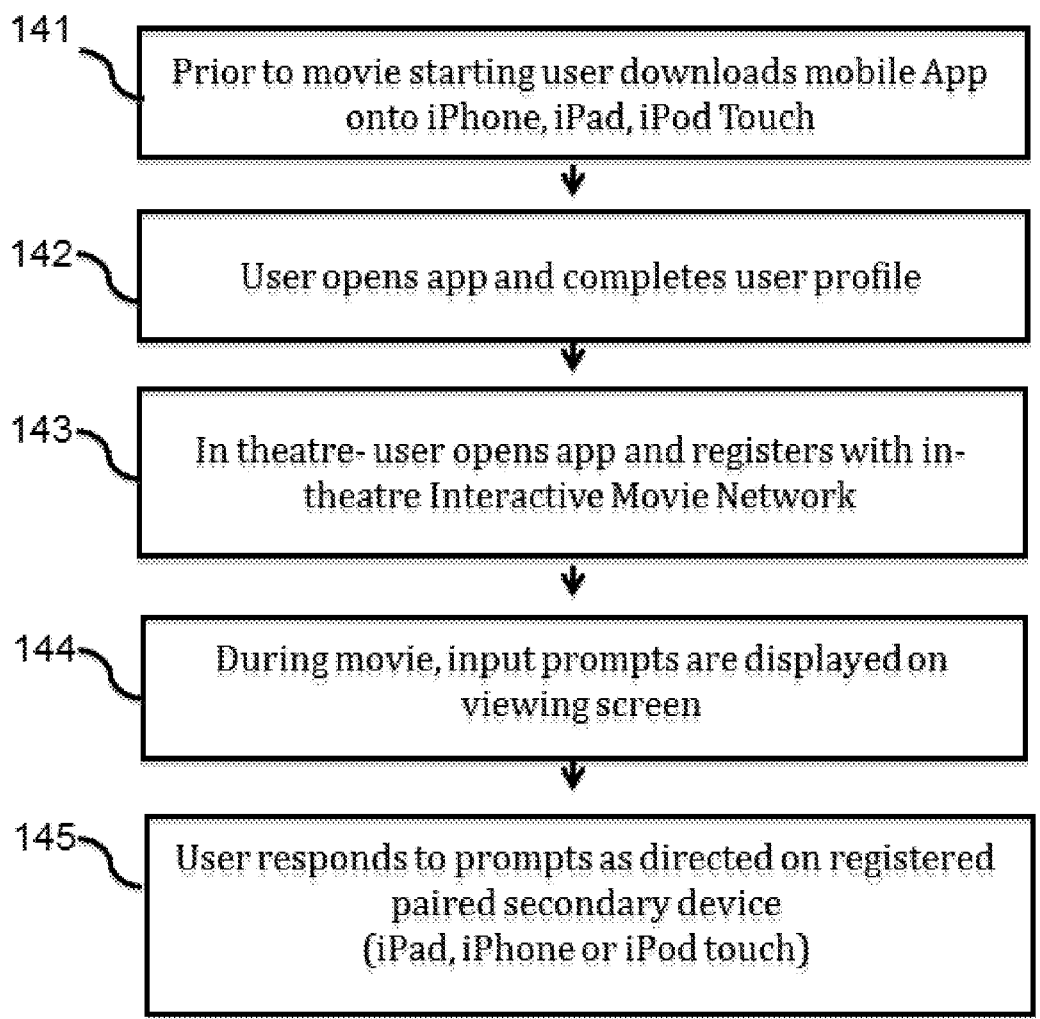
FIG. 14 depicts an exemplary embodiment of a method for viewing an interactive movie in a public theatre according to yet another aspect of the present invention.

Turning to FIG. 14, shown therein is an exemplary embodiment of a method 140 for interacting with a movie being displayed on movie theatre. First prior to the movie starting, the mobile App is downloaded by the user and installed on the his or her iPhone, iPad or iPod touch in step 141.

Next in step 142, the user opens the App and completes a user profile. In step 143, in the theatre the user opens the mobile App on the user's iPad, iPhone or iPod touch and registers on the in-theatre Interactive Movie Network Next, during the movie, input prompts are displayed on a movie screen in step 144. In step 145, the user responds to the prompts as directed on the user interface screen of the registed mobile device.

The mobile App can connect to: another instance of the mobile App installed on a separate device; an Apple TV device; or an Interactive Movie Network Appliance installed in a public viewing venue such as a movie theatre, concert hall, sporting arena, or similar large venues.

Multi-directional communication and interaction consists primarily of on-screen prompts for viewer input, and viewer responses to on-screen prompts. Input Prompts and Input Responses are exchanged wirelessly using standard WIFI and Bluetooth protocols.

Production Process for Dynamic Interactive Movie Content

Figure 6:
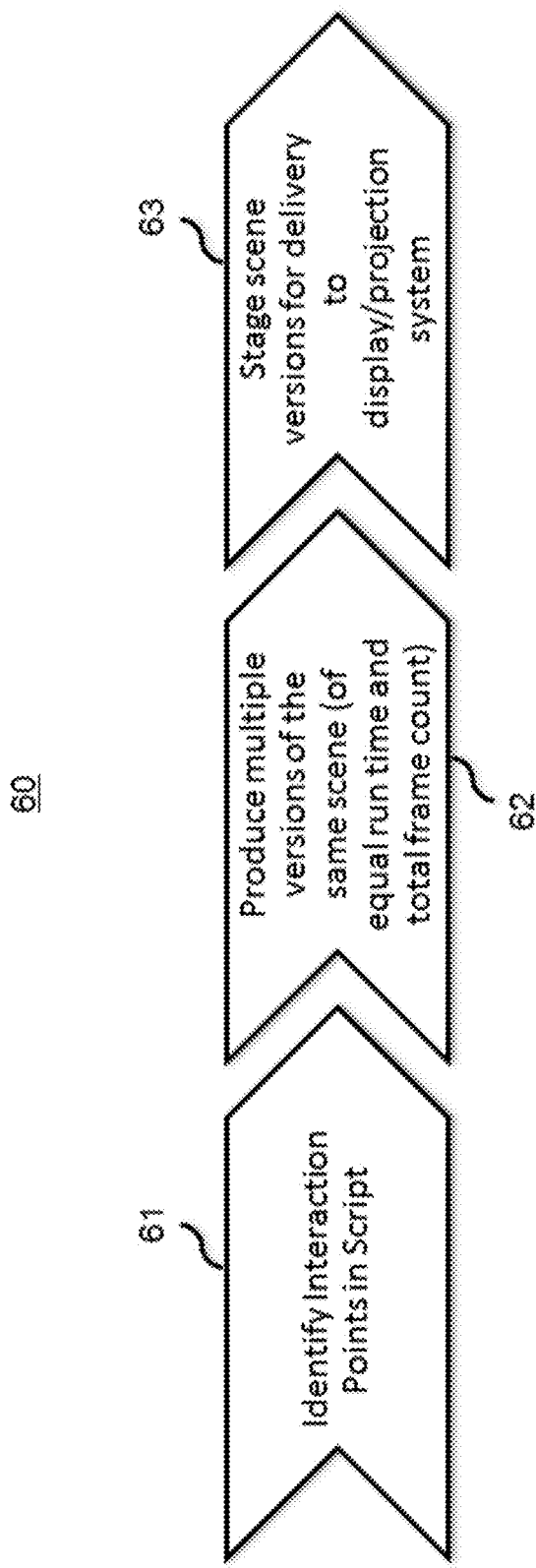
FIG. 6 depicts an exemplary embodiment of a process for developing dynamic interactive movie content which enables audience participation in a movie presentation in a public or home theatre according to yet another aspect of the present invention.

Referring to FIG. 6, an exemplary embodiment of a process 60 for interactive audio/video content production is shown therein. Dynamic Interactive Movie content production happens in both the content development phase, writing phase, and in the production and editing phases.

Writing Phase

When movie content is written in the form of a screenplay, Interaction Points are identified in the script 61. These interaction points are places where feedback/input from the audience is collected, tallied and used to determine what is seen on the screen or heard through speakers, or detected through other senses, in the physical movie viewing environment.

Production and Editing Phase

Interaction points are established by shooting or creating (in the case of animated movies), multiple versions of the same scene 62. These scene versions are then staged for delivery to the display, based on the inputs received from the audience 63.

What is claimed is:

1. An apparatus for enabling a movie viewer to interact with a movie being displayed by a display device comprising:
   a storage to store an interactive movie including one or more interaction points, each interaction point being associated with at least two alternative movie segments, each alternative movie segment of said at least two alternative movie segments for a given interaction point: (i) having an identical number of frames as all other ones of said at least two alternative movie segments for the given interaction point; (ii) an equal run time as all other ones of said at least two alternative movie segments for the given interaction point; and (iii) being assigned a code uniquely identifying said each alternative movie segment of said at least two alternative movie segments for the given interaction point, and said storage to store each alternative movie segment of said at least two alternative movie segments in association with said code for said each alternative movie segment;
   a processor to couple to said storage and to cause said storage to output either of said at least two alternative movie segments to the display device;
   a computer readable media including a software application downloadable to a mobile computing device to enable a user of the mobile computing device to register with the processor using the mobile computing device and to receive a prompt from said processor on the mobile computing device and to respond to said prompt using the mobile computing device;
   a synchronized content clock to receive run time data from the digital display device and run time data from the storage and in combination with the processor to insert one or more movie segments dynamically at exactly a right time so there is no latency or delay in a story flow in the interactive movie being displayed;
   said processor to:
   send an interactive message prompt prior to said each interaction point to request one or more registered users to vote on which one of said at least two alternative movie segments should be included in the movie being displayed;
   receive one or more votes from said one or more registered users regarding said interactive message prompt;
   tally all received votes from said one or more registered users regarding said interactive prompt; and
   cause said storage to output one of said at least two alternative movie segments based on said tally to said display device;
   wherein one of said at least two alternative movie segments is designated a default movie segment, which is selected if no user inputs are received and processed in time.

2. The apparatus according to claim 1, further comprising a wireless network to communicate with one or more mobile computing devices of one or more users.

3. The apparatus according to claim 1, wherein said one or more mobile computing devices includes one or more of the following: a smart phone, a cell phone, a mobile phone, a handheld computer, a laptop computer, and a mobile gaming device.

4. The apparatus according to claim 1, wherein said processor:
   delivers real time input prompts to one or more registered mobile computing devices through the downloadable software application, which has been installed on the one or more mobile computing devices;
   receives one or more input responses from the one or more registered mobile computing devices;
   analyzes and tabulates said one or more input responses in real-time by a running sum routine, in which each received input response is tallied by a response type, the response type counts are compared and rank ordered, based on a total number of input responses, from most input responses to least input responses; and makes an immediate determination as to which one of the two or more alternative movie segments that corresponds to a most input response should be output from the storage to the digital display device.

5. The apparatus according to claim 1, wherein the storage comprises a relational database and each alternative movie segment is stored in relation to its unique code.

6. The apparatus according to claim 1, wherein said display device comprises one selected from the group of: a movie projector, a television, a digital display, an LED display, a plasma display, and a computerized screen in a public arena.

7. The apparatus according to claim 1, wherein said display device includes a set top box.

8. A method for enabling a movie viewer to interact with a movie being displayed by a digital display device comprising:
    storing in memory an interactive movie including one or more interaction points;
    associating each interaction point with at least two alternative movie segments, each alternative movie segment of said at least two alternative movie segments for a given interaction point having an identical number of frames as all other ones of said at least two alternative movie segments for the given interaction point, and an equal run time as all other ones of said at least two alternative movie segments for the given interaction point;
    assigning a code uniquely identifying said each alternative movie segment of said at least two alternative movie segments for the given interaction point;
    storing each of said at least two alternative movie segments in memory in relation to said code;
    sending an interactive message prompt prior to said each interaction point to request one or more registered users to vote on which one of said at least two alternative movie segments should be included in the movie being displayed;
    receiving one or more votes from said one or more registered users regarding said interactive message prompt;
    tallying all received votes from said one or more registered users regarding said interactive prompt;
    outputting one of said at least two alternative movie segments based on said tally to a display device;
    receiving by a synchronized content clock run time data from the digital display device;
    inserting one or more movie segments dynamically at exactly a right time so there is no latency or delay in a story flow in the interactive movie being displayed;
    designating one of said at least two alternative movie segments as a default movie segment; and
    inserting the default movie segment if no user inputs are received and processed in time.

9. The method according to claim 8, further comprising communicating with one or more mobile computing devices of one or more users using a wireless network.

10. The method according to claim 8, wherein said one or more mobile computing devices includes one or more of the following: a smart phone, a cell phone, a mobile phone, a handheld computer, a laptop computer, and a mobile gaming device.

11. The method apparatus according to claim 8, further comprising:
    delivering real time input prompts to one or more registered mobile computing devices through a downloadable software application, which has been installed on the one or more mobile computing devices;
    receiving one or more input responses from the one or more registered mobile computing devices;
    analyzing and tabulating said one or more input responses in real-time by a running sum routine, in which each received input response is tallied by a response type, the response type counts are compared and rank ordered, based on a total number of input responses, from most input responses to least input responses; and
    determining which one of the two or more alternative movie segments that corresponds to a most input response should be output from the storage to the digital display device.

12. The method according to claim 8, further comprising maintaining synchronization of the interactive movie and said at least two alternative movie segments using a synchronized content clock that receives run time data from the display device and run time data from the storage to insert one of the at least two alternative movie segments dynamically at exactly a right time so there is no latency or delay in a story flow being displayed.

13. The method according to claim 8, wherein the storage comprises a relational database and each alternative movie segment is stored in relation to its unique code.

14. The method according to claim 8, wherein said display device comprises one selected from the group of: a movie projector, a television, a digital display, an LED display, a plasma display, and a computerized screen in a public arena.

15. The method according to claim 8, wherein said display device includes a set top box.

16. A computer method for creating an interactive movie comprising:
    establishing with a computer one or more interaction points within the movie;
    associating with a computer each interaction point with at least two alternative movie segments;
    preparing each alternative movie segment of said at least two alternative movie segments for a given interaction point so that said each alternative movie segment of said at least two alternative movie segments for a given interaction point has an identical number of frames as all other ones of said at least two alternative movie segments for the given interaction point;
    preparing said each alternative movie segment of said at least two alternative movie segments for a given interaction point so that said each alternative movie segment of said at least two alternative movie segments for a given interaction point has an equal run time as all other ones of said at least two alternative movie segments for the given interaction point;
    assigning with a computer a code uniquely identifying said each alternative movie segment of said at least two alternative movie segments for the given interaction point;
    sending an interactive message prompt prior to said each interaction point to request one or more registered users to vote on which one of said at least two alternative movie segments should be included in the movie being displayed;
    receiving one or more votes from said one or more registered users regarding said interactive message prompt;
    tallying all received votes from said one or more registered users regarding said interactive prompt;
    outputting one of said at least two alternative movie segments based on said tally to a display device;
    receiving by a synchronized content clock run time data from a digital display device;
    inserting one or more movie segments dynamically at exactly a right time so there is no latency or delay in a story flow in the interactive movie being displayed;

designating one of said at least two alternative movie segments as a default movie segment; and inserting the default movie segment if no user inputs are received and processed in time.

17. The method according to claim 16, further comprising pre-staging each of said at least two alternative movie segments in a content repository, wherein a processor determines which one of said at least two alternative movie segments is most popular to one or more viewers, and triggers a dynamic serving of said one of said at least two alternative movie segments.

18. An interactive movie produced according to the method of claim 16.

* * * * *